United States Patent
Rao et al.

(10) Patent No.: US 9,604,588 B1
(45) Date of Patent: Mar. 28, 2017

(54) REAR ROW KNEE BOLSTER DEPLOYMENT CONTROL

(71) Applicant: Ford Global Technologies, LLC, Dearborn, MI (US)

(72) Inventors: Manoharprasad K. Rao, Novi, MI (US); Mark A. Cuddihy, New Boston, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 14/951,538

(22) Filed: Nov. 25, 2015

(51) Int. Cl.
| | |
|---|---|
| *B60R 21/015* | (2006.01) |
| *B60R 21/207* | (2006.01) |
| *B60R 21/04* | (2006.01) |
| *G01J 1/42* | (2006.01) |
| *B60R 21/00* | (2006.01) |
| *B60R 21/01* | (2006.01) |

(52) U.S. Cl.
CPC ........ *B60R 21/01534* (2014.10); *B60R 21/04* (2013.01); *G01J 1/42* (2013.01); *B60R 2021/0051* (2013.01); *B60R 2021/01252* (2013.01); *B60R 2021/01286* (2013.01)

(58) Field of Classification Search
CPC .............. B60R 21/01534; B60R 21/04; B60R 2021/01252; B60R 2021/0051; B60R 2021/01286; G01J 1/42
See application file for complete search history.

(56) References Cited

U.S. PATENT DOCUMENTS

| | | |
|---|---|---|
| 5,330,226 A | 7/1994 | Gentry et al. |
| 5,482,314 A | 1/1996 | Corrado et al. |
| 5,738,368 A * | 4/1998 | Hammond ............... B60N 2/68 280/730.1 |
| 5,871,232 A | 2/1999 | White |
| 6,026,340 A | 2/2000 | Corrado et al. |
| 6,220,627 B1 | 4/2001 | Stanley |
| 6,249,729 B1 | 6/2001 | Corrado et al. |
| 6,272,411 B1 | 8/2001 | Corrado et al. |
| 6,298,311 B1 | 10/2001 | Griffin et al. |
| 6,323,487 B1 | 11/2001 | Wu |
| 6,367,837 B1 | 4/2002 | Hamada et al. |
| 6,697,723 B2 | 2/2004 | Olsen et al. |

(Continued)

FOREIGN PATENT DOCUMENTS

| | | |
|---|---|---|
| CN | 104417480 | 3/2015 |
| WO | WO 9954172 | 10/1999 |

OTHER PUBLICATIONS

Kee, Ryan S., "Detection Systems for Airbag Deployment", Olivet Nazarene University, Mar. 2014.

*Primary Examiner* — Michael J Zanelli
(74) *Attorney, Agent, or Firm* — Frank MacKenzie; Bejin Bieneman PLC (57) ABSTRACT

A system comprises a controller for a vehicle. The controller comprises a processor and a memory. The controller is configured to make readings of an infrared sensor positioned to sense objects and motion in a rear passenger foot well. The controller determines if there is an object present in the foot well using the readings. The controller then determines if there is motion in the foot well using the readings. The controller then activates a knee bolster when motion is determined, and deactivates a knee bolster when motion is not determined.

19 Claims, 7 Drawing Sheets

(56) References Cited

U.S. PATENT DOCUMENTS

| | | |
|---|---|---|
| 7,016,537 B2 | 3/2006 | Cooper |
| 7,111,869 B2 | 9/2006 | David et al. |
| 7,457,692 B2 | 11/2008 | Gaboury et al. |
| 7,477,758 B2 | 1/2009 | Piirainen et al. |
| 7,758,069 B2 | 7/2010 | Enders |
| 8,340,863 B2 * | 12/2012 | Karatsinides .......... B60K 23/00 |
| | | 701/36 |
| 8,398,113 B2 * | 3/2013 | Choi .................... B60R 21/207 |
| | | 280/730.1 |
| 2002/0074786 A1 | 6/2002 | Hamperl |
| 2005/0151053 A1 | 7/2005 | Griffin et al. |
| 2010/0324774 A1 | 12/2010 | Bouni et al. |
| 2015/0066308 A1 | 3/2015 | Nagasawa |

\* cited by examiner

| Occupant Clarification Sensing System | ECU Supplemental Restraint Activate/Deactivate Decision (Assumes constant crash severity, same seat position, and seat belt use by all) | | | | |
|---|---|---|---|---|---|
| | Rear Facing Infant Seat | 3 year old child (34.1 pounds, 37.2 inches, Range: 20 pounds-40 pounds) | 6 year old child (51.6 pounds, 45.0 inches, Range: 40 pounds-60 pounds) | Adult Female, <5th percentile (108 pounds, 59.1 inches) | Adult Female, >=5th percentile (108 pounds, 59.1 inches) |
| Bladder Sensor or Strain Gauge (Min. Weight Threshold = Base) | Deactivate | Deactivate | Deactivate | Deactivate | Activate |
| Bladder Sensor or Strain Gauge (Min. Weight Threshold = Base) and Leg Position and Leg Motion detected | Deactivate | Deactivate | Activate | Activate | Activate |

FIG. 7

REAR ROW KNEE BOLSTER DEPLOYMENT CONTROL

BACKGROUND

Present supplemental restraints including deployable knee bolsters and air bags are used in motor vehicles to provide occupant protection by providing a reaction element that resists the motion of an occupant in a controlled manner during an impact. Airbags are inflatable and are commonly used to provide increased occupant protection for the torso and head. Knee bolsters are deployed to help resist forward movement of the knees and thighs. Knee bolsters can also be inflatable, but commonly include molded plastic bladders and when fully deployed occupy much less volumetric space than an airbag. Some present knee bolsters reposition a vehicle trim component into a knee area of a passenger compartment upon detection of a collision. Once deployed, present supplemental restraints, especially inflatable supplemental restraints, need to be replaced and associated interior trim components may also need to be replaced. Present supplemental restraints are controlled by and selectively activated by an electronic control unit that receives signals from sensors, and processes such signals using software control logic stored in the electronic control unit. The electronic control unit sends out command signals to the supplemental restraints responsive to the signals received and the control logic.

The availability of supplemental restraints and the deployment control command logic each vary with seating position. Use of supplemental restraints for rear seat positions is presently more limited than for front seat positions.

Possible changes in vehicle interiors, including front seats rotatable to rear facing positions as may be enabled by autonomous vehicles, and increased supplemental restraints in rear seats, are rendering current sensing systems and deployment logic inadequate for future vehicle configurations. It is desirable to provide improved occupant sensors and improved supplemental restraint deployment control command logic suited for used with future vehicle configurations.

DETAILED DESCRIPTION

Relative orientations and directions (by way of example, upper, lower, bottom, rearward, front, rear, back, outboard, inboard, inward, outward, let, right) are set forth in this description not as limitations, but for the convenience of the reader in picturing at least one embodiment of the structures described.

Figure 1:
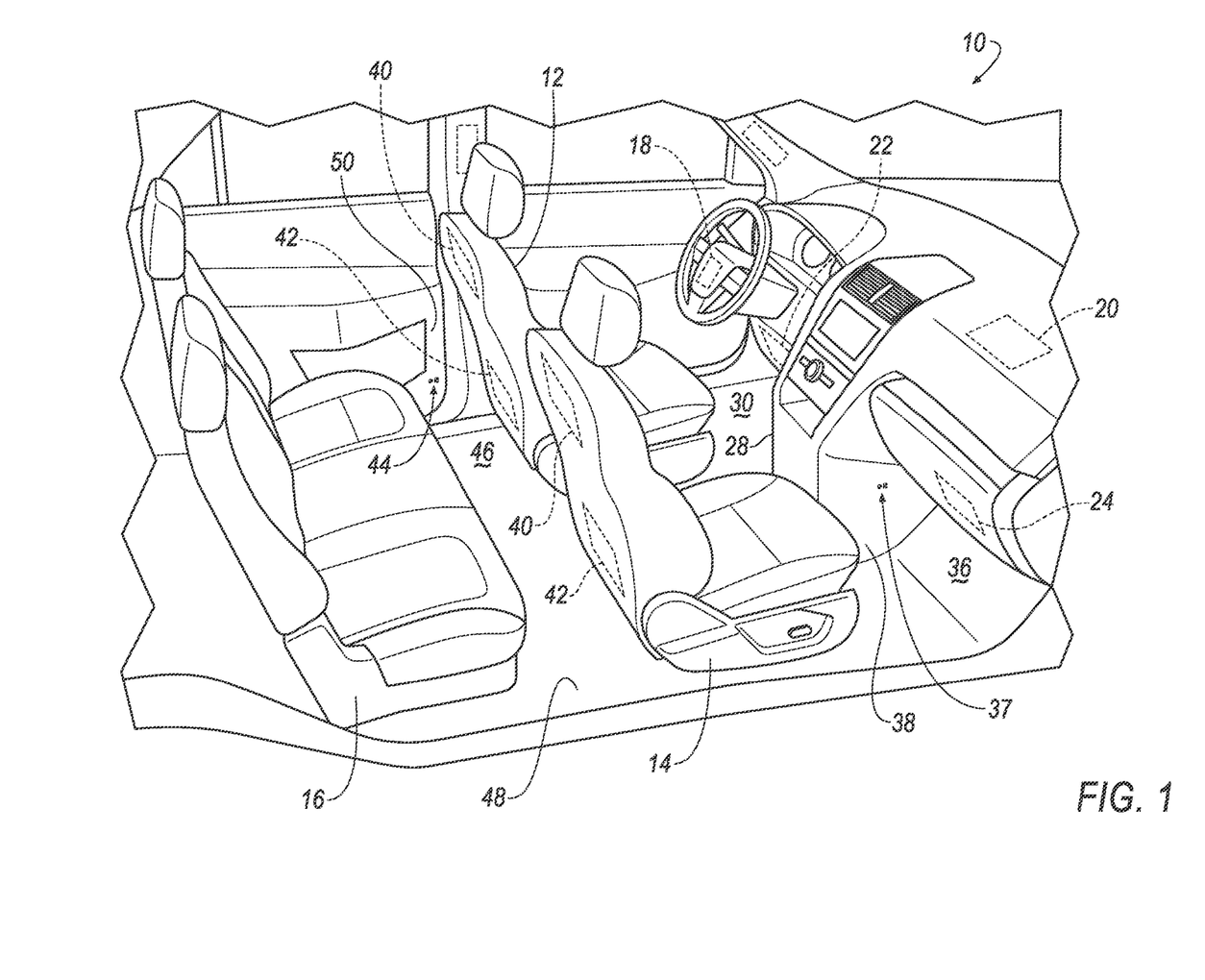
FIG. 1 is a perspective view of an example of an interior seat arrangement of a vehicle with pivotable front seats in a forward-facing position.

FIG. 1 shows a seat arrangement for a motor vehicle 10 with seats conventionally oriented in a forward-facing direction. The exemplary seats include a pivotable driver seat 12, a pivotable front passenger seat 14, and rear seats provided by a fixed rear bench seat 16. Alternative configurations for each of the seats can be employed. For example, in the case of a larger vehicle having a third row of seats, the rear bench would be located further back, and a middle row, or first rear row of seats would be disposed between the front seats and the rear bench. Each of the first rear row of row seats could be pivotable, and the bench or second rear row could be fixed. Or the second rear row of seats could be provided by pivotable seats, enabling the rear passengers to face in the rearward direction.

In the illustrated embodiment, supplemental restraints are disposed in locations to protect the passengers. An exemplary driver side front air bag 18 is disposed in the steering wheel. An exemplary front passenger side front air bag 20 is disposed in a dashboard. An exemplary driver side knee bolster 22 is installed on a lower side of the dashboard in front of driver seat 12, and a passenger side knee bolster 24 is installed on the lower side of the dashboard in front of passenger seat 14.

Figure 3:
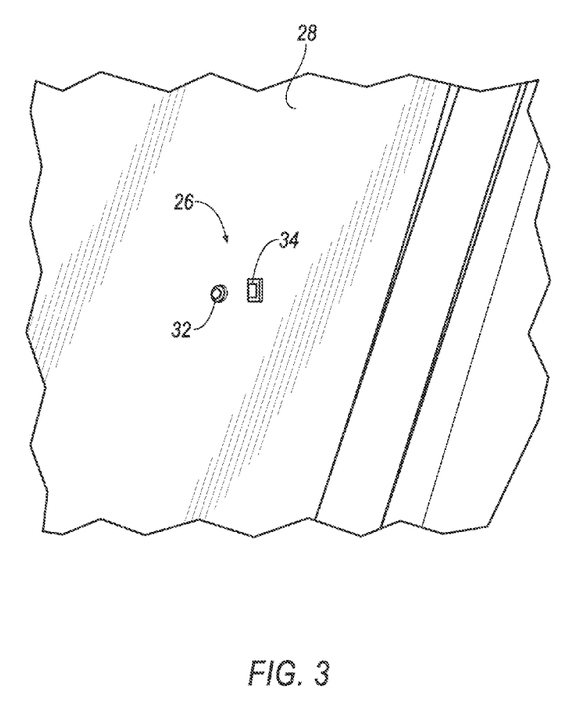
FIG. 3 is a side view of an example of an infrared sensor disposed in a vehicle trim panel.

A driver side infrared proximity sensor 26 is installed in a driver side interior trim panel 28 that is disposed on an inboard side of a driver foot well 30. Trim panel 28 is proximate to and borders foot well 30. The location of sensor 26, in a line of sight to foot well 30, enables sensor 26 to emit an unimpeded beam of infrared light from sensor 26 to foot well 30. Infrared sensor 26 may alternatively be mounted on an outboard side of driver foot well 30 in a door trim panel. The illustrated embodiment of FIG. 3 shows an active sensor 26 characterized by the inclusion of both an infrared emitter 32 which emits infrared light and an infrared receptor 34 which detects or senses infrared light. Trim panel 28 includes separate apertures for each of emitter 32 and receptor 34. An exemplary embodiment of sensor 26 includes a plastic housing. Sensor 26 is mounted to panel 28 by conventional means such as heat staking or threaded fasteners to a back side of trim panel 28 opposite a passenger cabin area in which the foot wells are disposed. Active sensors are key to the function of the described embodiments as active sensors are able to detect the presence and location of object and to detect motion. Passive infrared sensors are less expensive than active infrared sensors but are disadvantageously less functional than the active sensors. Passive sensors include only an infrared receptor, are typically limited to use for detecting motion, and are more predisposed to providing false positive indications of foot motion than active sensors.

An infrared proximity sensor 37 for the front passenger foot well 36 may be installed in a front passenger trim panel 38. Infrared sensor 37 may alternatively be mounted on an outboard side of passenger foot well 36 in a door trim panel (not shown).

Rear passenger air bags 40 are illustrated as being disposed on a rear surface of seats 12 and 14. Rear passenger knee bolsters 42 are similarly illustrated as being disposed in a lower area of seats 12 and 14. A left side rear passenger infrared proximity sensor 44 and a right side rear passenger infrared proximity sensor (not shown) are respectively disposed to detect objects and motion in a left side rear passenger foot well 46 and a right side rear passenger foot well 48 respectively. The exemplary rear sensors are respectively disposed in a left side rear passenger door trim panel 50 and a right hand rear passenger door trim panel (not shown). The rear sensors could alternatively be located further inboard, as in a lower part of rear seat 16 for example. As yet another alternative, rear sensors could be located on the backs of seats 12 and 14 when supplemental restraints 40, 42 are disposed in the backs of seats 12 and 14. Such a location would beneficially fail to detect motion of rear seat occupants when seats 12 and 14 are in a position facing the rear seat occupants. The supplemental restraints 40 and 42, when directed away from the rear seat occupants due to pivoting of the seats, would not deploy. Alternatively or complementarily, activation of restraints 40 and 42 can be linked to a signal from sensors indicating rotary positions of seats 12 and 14. Restraints 40 and 42 in a seat 12 or 14 are deactivated when the rotary seat position of a seat indicates that the seat is outside of a predetermined deployment position associated with providing a safety benefit to a rear seat occupant. The predetermined deployment position can be defined as a rotational range. The restraints 40 and 42 will not deploy when the seat in which the restraints are mounted is rotated to a position in which the restraints will not provide any benefit.

Active infrared sensors are capable of providing signals that can be used to establish a location of an object relative to at least the sensors. The activation and deactivation of knee bolsters 42 for rear seating positions is, in one exemplary embodiment, controlled as a function of a size of a gap between occupant legs and the back of a more forward seat such as seat 12 or seat 14.

For three-row arrangements having a first row of rear seats (alternatively characterized as a middle row of seats) behind seats 12 and 14 and a second row of rear seats behind the first rear row of rear seats, sensors for the first row may be installed, as described above, in door trim panels, in a lower part of the first row rear seats, or in seats 12 and 14. Sensors for the second rear row of seat may be installed in trim panels adjacent to the second rear row foot wells, in a lower part of the second row rear seats, or in a back of first row rear seats.

Sensors and airbags and knee bolsters collectively comprise a supplemental restraint system. The supplemental restraint system also includes an electronic control unit (not shown), alternatively characterized as a controller or a computer. The electronic control unit is electrically connected to the infrared sensors, as well as other sensors which can include, by way of example, sensors of seat weight load, vehicle speed, accelerometers indicating changes in vehicle speed, and seat position. The sensors provide electrical signals to the electronic control unit indicative of their respective parameters. Samples of the signals are alternatively characterized herein as data or as readings or as data readings or as data values. The airbags and knee bolsters are also electrically connected to the electronic control unit. Such electronic connections may be made with wire or without wire.

The electronic control unit includes at least one electronic processor and associated memory. The processor's operating system software is stored in memory for access by the processor. Also, control software for executing certain predetermined tasks is maintained in memory. The memory also includes a buffer region, or more simply a buffer, facilitating the storage and manipulation of data. The exemplary buffer is provided with a predetermined number of locations to store data, limiting the number of data readings stored in the buffer. When the limited number of readings is reached, the buffer is characterized as being "full." When the buffer is full, data readings are, in an exemplary embodiment, replaced on a first-in-first-out basis. That is, the oldest data reading in the buffer is overwritten by the most recent reading. The different memory sections can be accommodated either with a single memory device, or with multiple devices dedicated to particular memory functions. The precise structure of the electronic control unit is not critical to the present description. Representations of alternative embodiments of the software are found in FIGS. 4, 5 and 6.

The electronic control unit is programmed by control software to both activate and deactivate at least the knee bolsters. A knee bolster that has been activated is ready for deployment responsive to an indication, such as data exceeding a certain value from one or more accelerometers that a vehicle impact has occurred. A knee bolster that has been deactivated will not deploy responsive to an indication that a vehicle impact has occurred.

Figure 2:
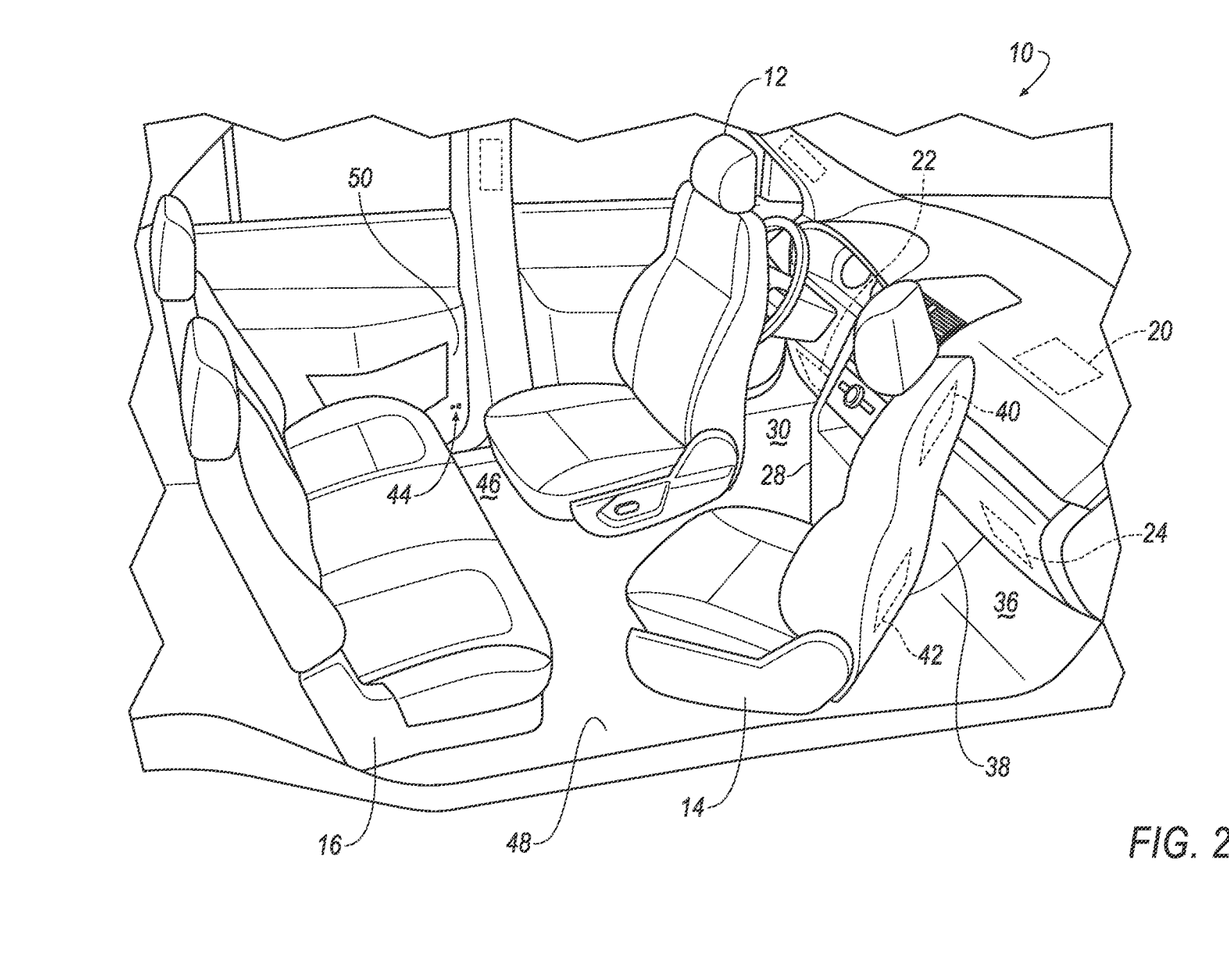
FIG. 2 is a perspective view of the example of the interior seat arrangement of FIG. 1 with the pivotable front seats in a rearward-facing position.
Figure 4:
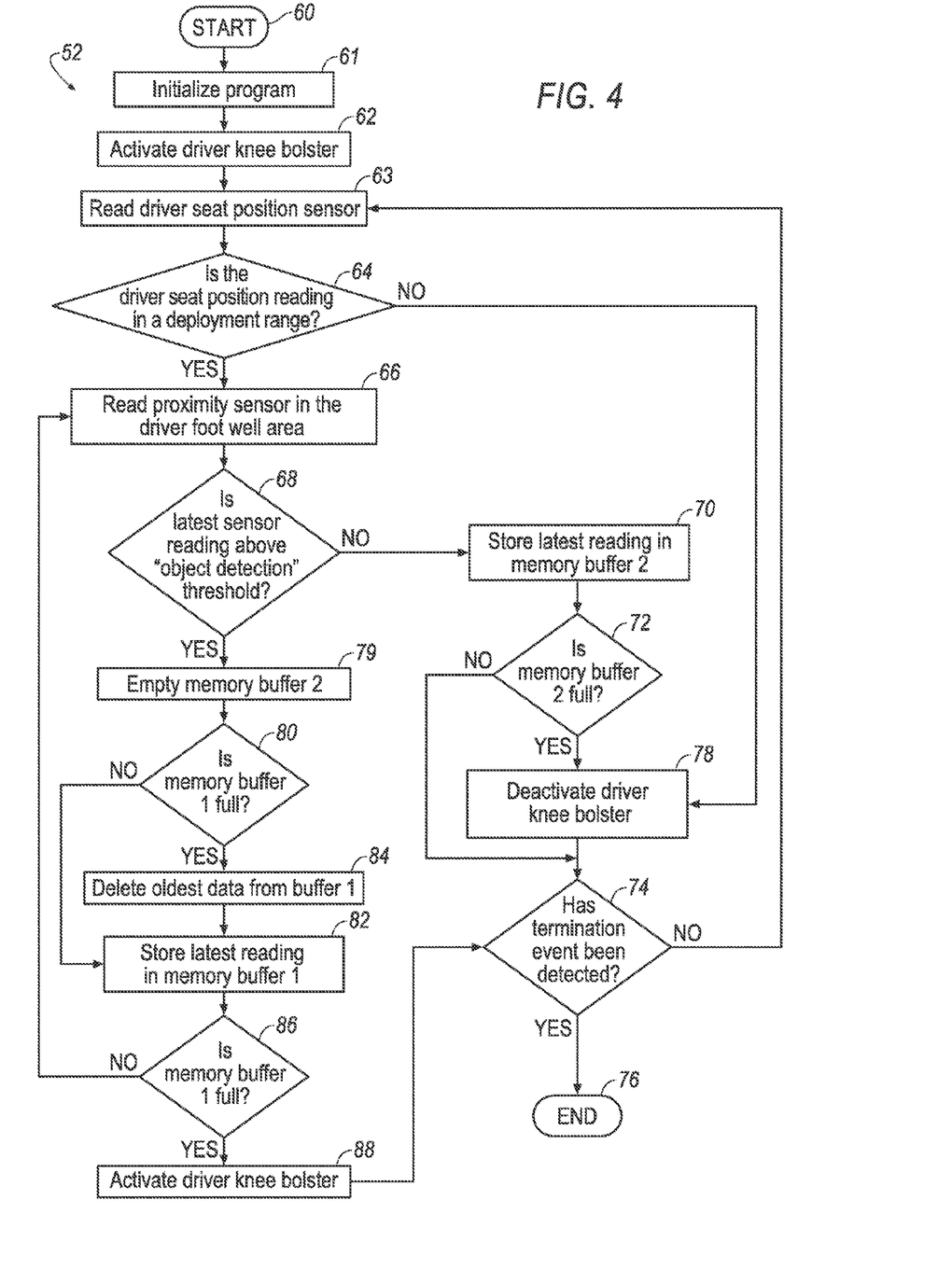
FIG. 4 is an exemplary logic diagram flow chart for control of a supplemental restraint.

FIG. 4 will be discussed with reference to FIGS. 1, 2 and 3. When driver seat 12 is occupied, and in a forward facing orientation, it is desirable that the supplemental restraints and particularly the driver position knee bolster be activated in anticipation of a need for possible deployment. When seat 12 is occupied, and in a rearward facing orientation, it is preferred that airbag 18 and knee bolster 22 not deploy. It is also preferred that airbag 40 and knee bolster 42 not deploy when seat 12 is facing rearward. FIG. 4 illustrates a logic diagram 52 for computer program software which assesses whether there is a forward-facing occupant in the driver seat 12. More specifically, the software employing the illustrated logic is stored in the electronic control unit and is used to detect the presence of feet in driver foot well 30 by determining if there is an object in foot well 30. The terms first buffer, first memory buffer and buffer 1 are used interchangeably throughout the following description of FIG. 4 and in FIG. 4. Likewise, the terms second buffer, second memory buffer and buffer 2 are used interchangeably. Also, the buffers associated with the description of a particular seat position are unique to that seat position. So, for example, a driver seat first buffer is distinct from a front passenger seat first buffer.

The processor executes the steps illustrated in FIG. 4 as described below. In a start block 60, a computer program is initiated. A first memory buffer and a second memory buffer are emptied of stored values as part of an initialization routine in block 61. The initialization routine of block 61 captures zeroing the registers, reading program instructions from a static memory or other storage into the controller's random access memory ("RAM"), and other low-level software steps well-known in the software art, and not critical to the present description. The buffers act as means to acquire more than one successive reading from the sensor before changing knee bolster states. The length of the buffers determines the number of data points required before the system changes the knee bolster state. Per block 62, the driver knee bolster 22 is activated.

A driver seat position sensor (not shown) is read per process block 63 to determine the rotational position of seat 12. The program then moves to decision block 64. In decision block 64, the readings are compared to predetermined deployment position value ranges for seat 12. When the data value from the seat position sensor is outside of the predetermined deployment position range for the seat, the computer moves to process block 78. The driver knee bolster is deactivated per block 78. The program moves to decision block 74. Decision block 74 checks for a termination event. An exemplary termination event is the loss of an ignition signal. When a termination event has been detected, then the program is terminated at end block 76. When a termination event has not been detected, the program moves back to block 63 to make another reading.

Sensor 26 is read per process block 66. The latest sensor reading of sensor 26 is compared to a predetermined and stored value characterized as an "Object Detection Threshold" per decision block 68. In accord with decision block 68, when the latest sensor reading is not greater than the Object Detection Threshold, then the program moves to process block 70. The most recent reading, or data value, of block 66 is stored in to the second buffer, and the program moves to decision block 72.

Decision block 72 assesses whether the second buffer is full. When the second buffer is not full, the program moves to decision block 74. Decision block 74 checks for a termination event. An exemplary termination event is the loss of an ignition signal. When a termination event has been detected, then the program is terminated at end block 76. When a termination event has not been detected, the program moves back to block 63 to make another reading. When decision block 72 determines that the second buffer is full, the program, moves to process block 78. Per block 78, driver knee bolster 22 is deactivated. After block 78, the program cycles back to block 63 to make another reading, but only after confirming in decision block 74 that a termination event has not been detected.

When the latest sensor reading or data value of block 66 is greater than the Object Detection Threshold, then, per decision block 68, the program moves from block 68 to process block 79. Per block 79, the second memory buffer is emptied. This step causes the second memory buffer to start counting over again from zero the next time the proximity sensor reading drops below the object detection threshold. The program then move to decision block 80.

Decision block 80 assesses whether the first memory buffer is full. When the first memory buffer is not full, the program goes to block 82 where the latest reading is stored in the first buffer. When the first memory buffer is full, the program deletes the oldest data from the memory buffer, as per block 84, and then goes to block 82 where the latest reading is stored in the first buffer. The program then moves from block 82 to decision block 86 to assess whether the first memory buffer is full after storing the latest reading. When the first memory buffer is not full, the program cycles back to block 66 and again reads the proximity sensor. When the first memory buffer is determined to be full by block 86, the program cycles to process block 88. The program does not progress on to block 88 until the buffer is full. Since the first memory buffer is not emptied, the memory buffer only delays the decision to activate the driver knee bolster the first time the software routine is executed in a drive cycle. If the knee bolter is subsequently deactivated, a single subsequent reading above the object detection' threshold will reactivate it. In an alternative embodiment, the first buffer is filled in the initialization routine of block 61 and the first buffer automatically replaces the oldest reading with the newest reading. In block 88, the driver knee bolster is activated.

After block 88, the program proceeds on to decision block 74 to assess whether a termination event has been detected. If yes, then the program ends at block 76. If not, then the program cycles back to block 63 for a new reading. The preceding logic prevents the deployment of a driver knee bolster when the driver seat is facing rearward.

Figure 5:
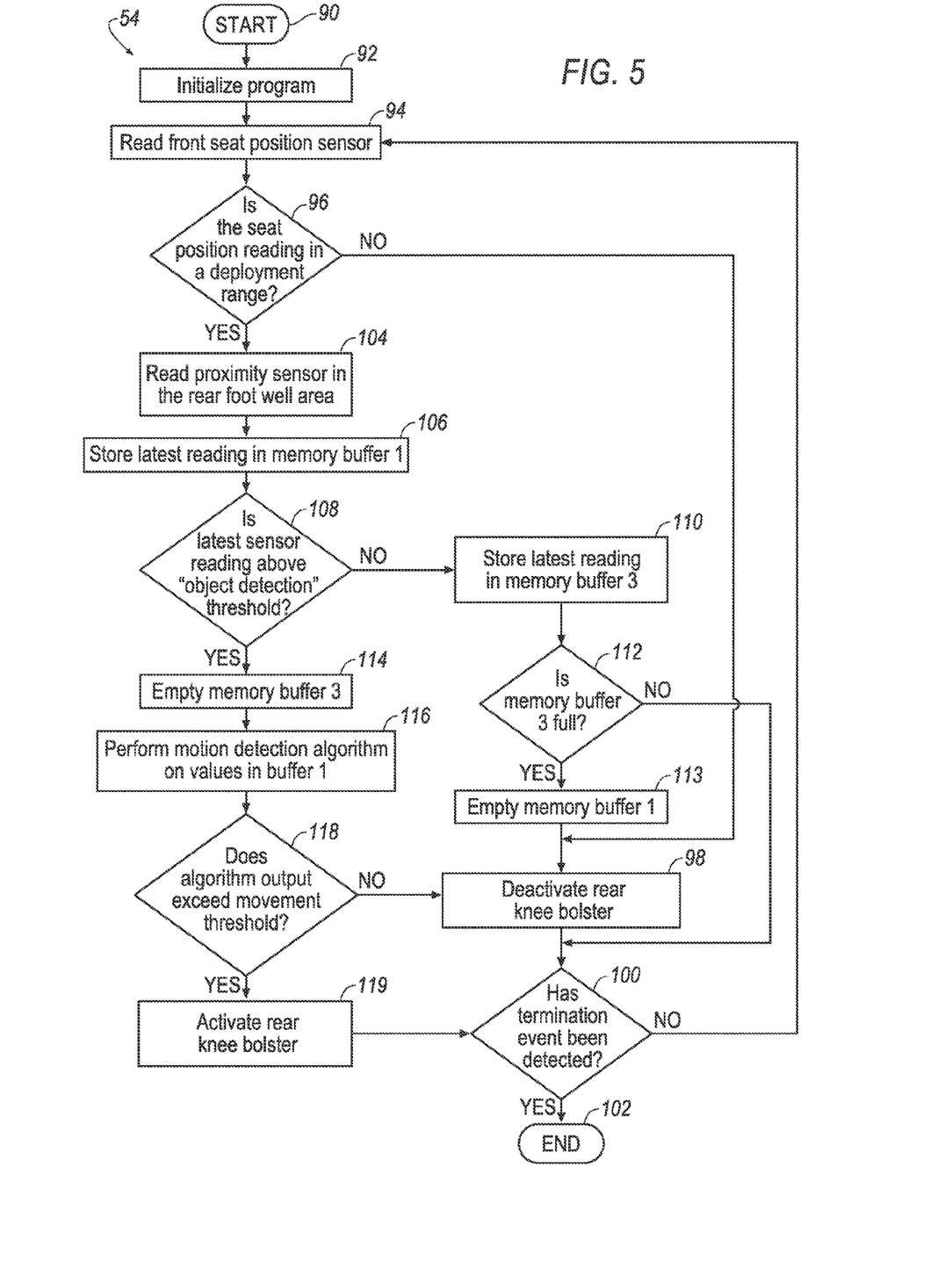
FIG. 5 is an alternative exemplary logic diagram flow chart for control of a supplemental restraint.

FIG. 5 will be discussed with reference to FIGS. 1, 2 and 3. The illustrated exemplary rear seat 16 is fixed in a forward facing position, and has two seating positions, a left position and a right position. While the functionality is the same for both seating positions, the following discussion will, for the sake of clarity, use the left seating position as an example. When seat 16 is occupied and the front seats 12, 14 are in a forward facing orientation, it is desirable that the rear seat supplemental restraints 40, 42 be activated in anticipation of a need for possible deployment. When seat 16 is not occupied, it is preferred that airbags 40 and knee bolsters 42 not deploy. FIG. 5 illustrates a logic diagram 54 for computer program software which assesses whether there is an occupant in rear seat 16. More specifically, the software employing the illustrated logic is stored in the electronic control unit and is used to detect the presence of feet in rear foot well 46 by determining if there is motion in foot well 46.

The processor executes the steps illustrated in FIG. 5 as described below. In a start block 90, the computer program is initiated. A first memory buffer, a second memory buffer and a third memory buffer are all emptied of stored values as part of an initialization routine in block 92. The initialization routine of block 92 captures zeroing the registers, reading the process into the controller's random access memory ("RAM"), and other low-level software steps well-known in the art of controller software, and not critical to the present description. Knee bolster 42 is activated as part of the initialization routine. The terms first buffer, first memory buffer and buffer 1 are used interchangeably throughout the following description of FIG. 5 and in FIG. 5. Likewise, the terms second buffer, second memory buffer and buffer 2 are used interchangeably and third buffer, third memory buffer and buffer 3 are used interchangeably.

Front passenger seat position sensors (not shown) are read per process block 94 to determine the rotational positions of seats 12 and 14. The program then moves to decision block 96. In decision block 96, the readings are compared to predetermined deployment position value ranges for seats 12 and 14. When the data value from a seat's position sensor is outside of the predetermined deployment position range for the seat, the computer moves to process block 98. The rear knee bolster is deactivated per block 98. The program moves to decision block 100. Decision block 100 checks for a termination event. An exemplary termination event is the loss of an ignition signal. When a termination event has been detected, then the program is terminated at end block 102. When a termination event has not been detected, the program moves back to block 94 to make another reading.

When, in block 96, the data value from a seat's position sensor is within the predetermined deployment position range for the seat, the computer moves to process block 104. Sensor 44 is read per process block 104. The most recent reading of sensor 44 is then stored in the first buffer per process block 106. The first buffer is automatically updated on a first-in-first-out basis. The program moves to decision block 108 where the latest sensor reading of sensor 44 is compared to a predetermined and stored value characterized as an "Object Detection Threshold." In accord with decision block 98, when the latest sensor reading is not greater than the Object Detection Threshold, then the program moves to process block 110.

The most recent reading, or data value, of block 104 is stored in the third buffer on a first-in-first-out basis per block 110, and the program moves to decision block 112. Decision block 112 assesses whether the third buffer is full. When the third buffer is not full, the program moves to decision block 100. Decision block 100 checks for a termination event. When a termination event has been detected, then the program is terminated at end block 102. When a termination event has not been detected, the program moves back to block 94 to make another reading. When decision block 112 determines that the third buffer is full, the program empties the first buffer in block 113, and then moves to process block 98. Per block 98, knee bolster 42 is deactivated. After block 98, the program cycles back to block 94 to make another reading, but only after confirming in decision block 100 that a termination event has not been detected.

When decision block 108 determines that the most recent reading made in block 104 of sensor 44 is above the Object Detention Threshold, then the program moves to process block 114 which directs the emptying of the third buffer. The program then moves to process block 116.

In block 116, a motion detection process is performed on the values in the first buffer. The exact nature of the process is unimportant, but it results in a value suited to assessing whether or not there is a trend in the values of the proximity sensor readings indicative of a change in the value of the proximity sensor readings indicative of motion. An exemplary process includes the step of calculating the variance of the latest value stored in the first buffer relative to all of the values presently in the first buffer, and storing the variance of the most recent reading in a second buffer. The second buffer stores variance values for each of the buffered proximity sensor readings. The exemplary performance motion detection process would then add up all of the values of the second buffer to derive a motion detection process output. The program then moves to decision block 118.

Figure 6:
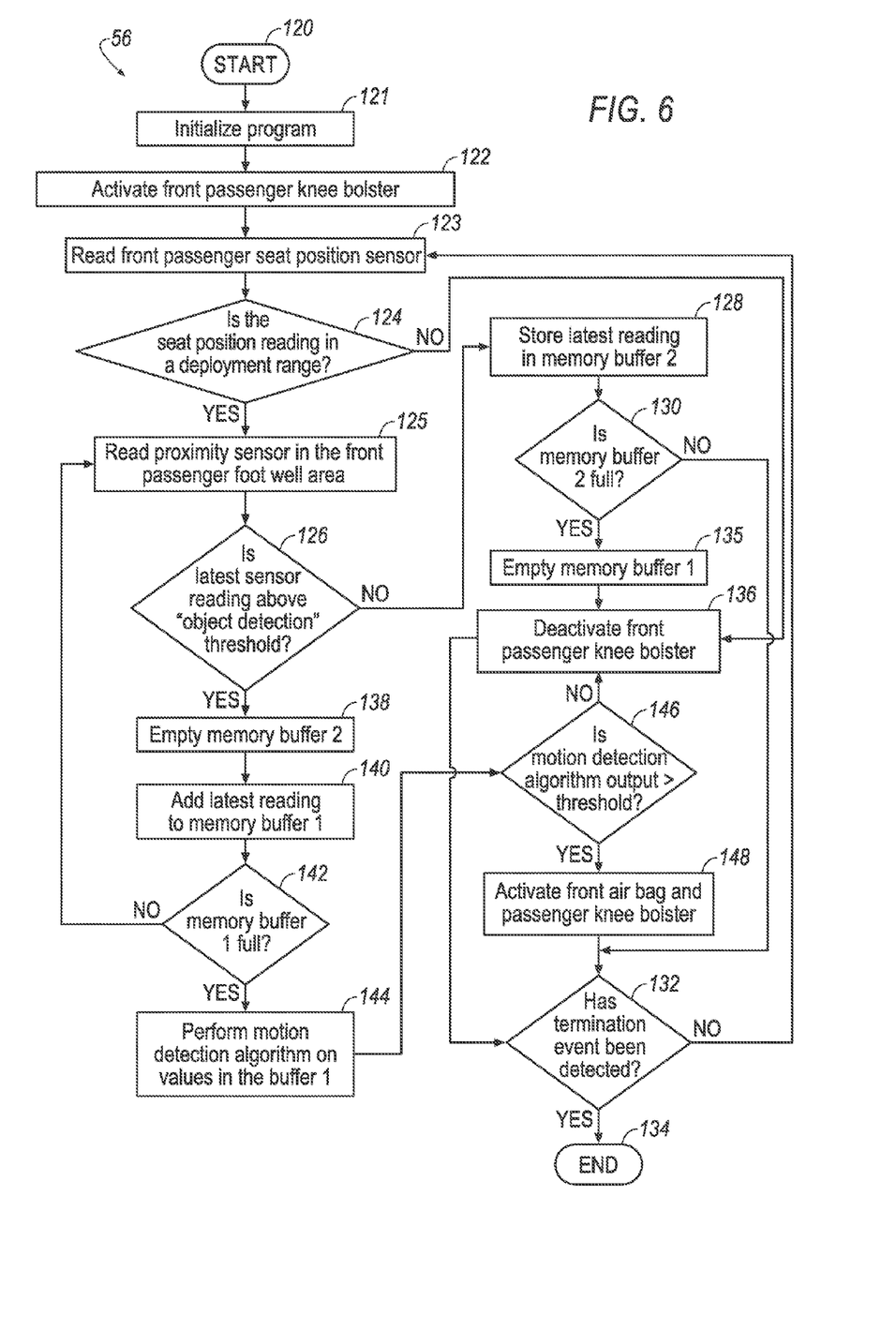
FIG. 6 is a second alternative exemplary logic diagram flow chart for control of a supplemental restraint.

Decision block 118 assesses whether or not the motion detection process output exceeds a pre-determined threshold. When it does not, as is characteristic of no motion being detected, block 118 directs the program to block 98 which deactivates the rear passenger knee bolster. After block 98, the program proceeds on to decision block 100 to assess whether a termination event has been detected. If yes, then the program ends at block 102. If not, then the program cycles back to block 94 for a new reading. When block 118 determines that the motion detection process output exceeds the pre-determined threshold, as is characteristic of motion being detected, then the program is directed to process block 119. Block 119 activates the rear passenger knee bolster. After block 119, the program proceeds on to decision block 100 to assess whether a termination event has been detected. If yes, then the program ends at block 102. If not, then the program cycles back to block 94 for a new reading. Logic diagram 54 does not include a decision box expressly checking to see if the first memory buffer is full, only because the first buffer is characterized as being automatically maintained in the illustrated embodiment. Alternatively, a decision block to check whether the buffer is full, such as block 80 of logic diagram 52 or block 142 of logic diagram 56 could be employed.

FIG. 6 will be discussed with reference to FIGS. 1, 2 and 3. The illustrated exemplary seat 14 is illustrated in FIG. 1 in a forward facing position and is pivotable, as shown in FIG. 2, to a rearward facing position. When seat 14 is occupied, and in a forward facing orientation, it is desirable that the supplemental restraints 20, 24 be activated in anticipation of a need for possible deployment. When seat 14 is occupied, and is in a rearward facing orientation, it is preferred that airbag 20 and knee bolster 24 not deploy. It is also preferred that airbag 40 and knee bolster 42 not deploy when seat 14 is facing rearward. FIG. 6 illustrates a logic diagram 56 for computer program software which assesses whether there is a forward-facing occupant in front passenger seat 14. More specifically, the software employing the illustrated logic is stored in the electronic control unit and is used to detect the presence of feet in front passenger foot well 36 by determining if there is motion in foot well 36.

The processor executes the steps illustrated in FIG. 6 as described below. In a start block 120, the computer program is initiated. A first memory buffer and a second memory buffer are each emptied of stored values as part of an initialization routine in block 121. The initialization routine of block 121 also captures zeroing the registers, reading the process into the controller's random access memory ("RAM"), and other low-level software steps well-known in the art of controller software, and not critical to the present description. The program then moves to process block 122. Knee bolster 24 is activated in accord with process block 122. The terms first buffer, first memory buffer and buffer 1 are used interchangeably throughout the following description of FIG. 6 and in FIG. 6. Likewise, the terms second buffer, second memory buffer and buffer 2 are used interchangeably and third buffer, third memory buffer and buffer 3 are used interchangeably.

A front passenger seat position sensor (not shown) is read per process block 123 to determine the rotational position of seat 14. The program then moves to decision block 124. In decision block 124, the readings are compared to predetermined deployment position value ranges for seat 14. When the data value from the seat position sensor is outside of the predetermined deployment position range for the seat, the computer moves to process block 136. The front passenger knee bolster is deactivated per block 136. The program moves to decision block 132. Decision block 132 checks for a termination event. An exemplary termination event is the loss of an ignition signal. When a termination event has been detected, then the program is terminated at end block 134. When a termination event has not been detected, the program moves back to block 123 to make another reading.

Sensor 37 is read per process block 125. The latest sensor reading of sensor 37 is compared to a predetermined and stored value characterized as an "Object Detection Threshold" per decision block 126. In accord with decision block 126, when the latest sensor reading is not greater than the Object Detection Threshold, then the program moves to process block 128. The latest reading or data value from sensor 37 per block 125 is stored in the second memory buffer per block 128. The second buffer is automatically updated on a first-in-first-out basis.

After block 128, the program moves to decision block 130. Decision block 130 assesses whether the second buffer is full. When the second buffer is not full, the program moves to decision block 132. Decision block 132 checks for a termination event. An exemplary termination event is the loss of an ignition signal. When a termination event has been detected, then the program is terminated at end block 134. When a termination event has not been detected, the program moves back to block 123 to make another reading. When decision block 130 determines that the second buffer is full, the program first empties the first memory buffer in process block 135, and then moves to process block 136. Per block 136, front passenger knee bolster 24 is deactivated. After block 136, the program cycles back to block 123 to make another reading, but only after confirming in decision block 132 that a termination event has not been detected.

When, per decision block 126, the latest sensor reading of block 125 is greater than the Object Detection Threshold, then the program moves from block 126 to process block 138 where the second memory buffer is emptied. The program then moves to process block 140. As per block 140, the latest reading is stored in the first memory buffer. The first buffer is automatically updated on a first-in-first-out basis. The program then moves to decision block 142.

Decision block 142 assesses whether the first memory buffer is full. When the first memory buffer is not full, the program goes to block 125 where another value from sensor 37 is read. When the first memory buffer is full, then the program advances to process block 144. In block 144, a motion detection process is performed on the values in the buffer. The exact nature of the process is unimportant, but it results in a value suited to assessing whether or not there is a trend in the values of the proximity sensor readings indicative of a change in the value of the proximity sensor readings indicative of motion. An exemplary process includes the step of calculating the variance of the latest value added to the buffer relative to all of the values presently in the buffer, and storing the variance of the most recent reading in a new third buffer. The third buffer includes variances for each of the buffered proximity sensor readings. The exemplary performance motion detection process would then add up all of the values of the third buffer to derive a motion detection process output.

The program moves from block 144 to decision block 146. Decision block 146 assesses whether or not the motion detection process output exceeds a pre-determined threshold. When it does not, as is characteristic of no motion being detected, block 146 directs the program to block 136 which deactivates the front passenger knee bolster. After block 136, the program proceeds on to block 132 to assess whether a termination event has been detected. If yes, then the program ends at block 134. If not, then the program cycles back to block 123 for a new reading. When block 146 determines that the motion detection process output exceeds the pre-determined threshold, as is characteristic of motion being detected, then the program is directed to process block 148. Block 148 activates the front passenger knee bolster 24 and front passenger airbag 20. After block 148, the program proceeds on to decision block 132 to assess whether a termination event has been detected. If yes, then the program ends at block 134. If not, then the program cycles back to block 123 for a new reading.

Figure 7:
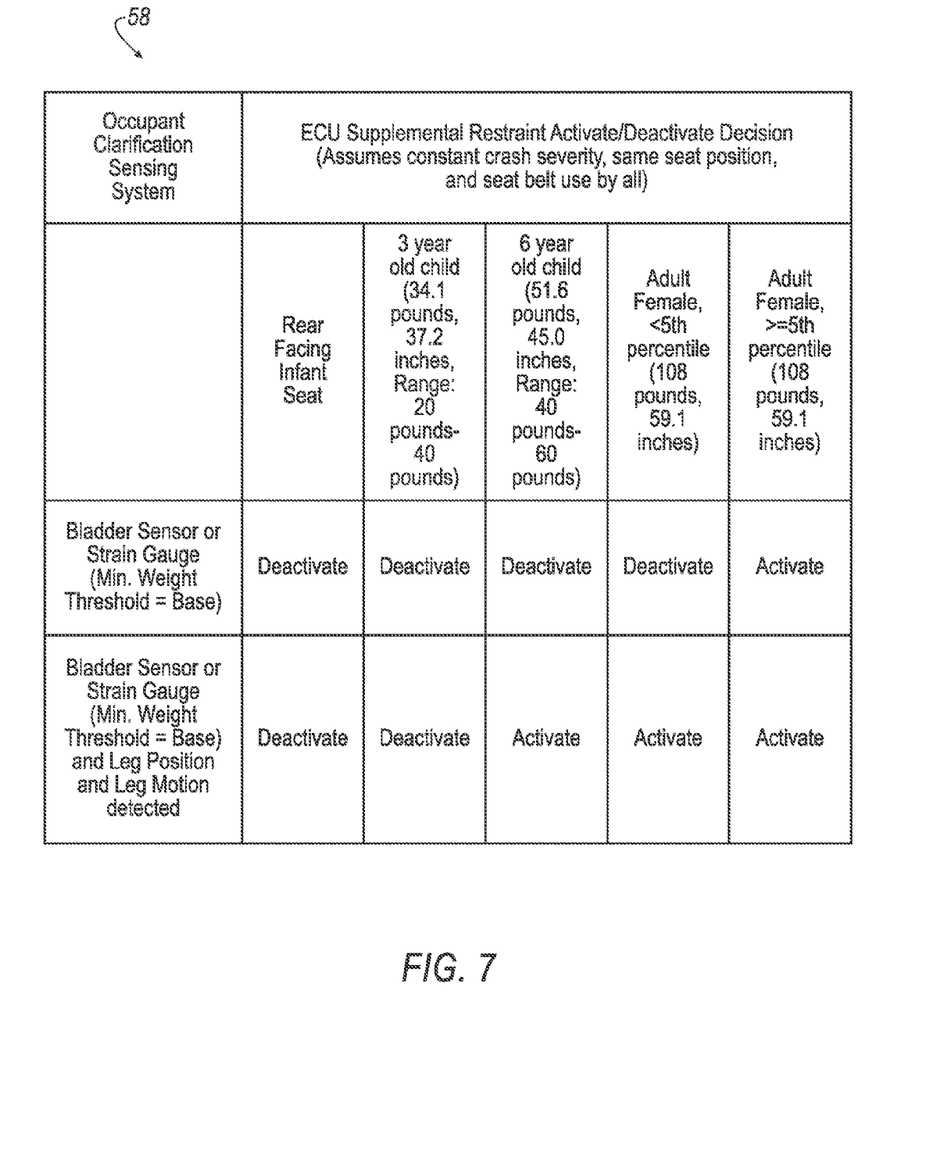
FIG. 7 is an exemplary logic diagram decision chart for control of a supplemental restraint.

FIG. 7 illustrates an exemplary logic diagram decision chart 58 for control of supplemental restraints that is particularly applicable to the deployment of supplemental restraints for passengers and especially front passengers. Chart 58 compares decisions made based on a variety of decision criteria. The introduction of leg motion as an available decision criteria beneficially enables knee bolster deployment. An exemplary software program executed by the electronic control unit employs the illustrated logic to activate and deactivate the knee bolster.

In some circumstances, particularly in the front passenger location, it is desirable to activate the air bag even when the passenger weight is less than that of a fifth percentile female. While the passenger may be lighter in weight, they may still be of sufficient height and strength to benefit from deployment of all available supplemental restraints. Because the driver of a typical vehicle is of at least a certain size to enable operation of the vehicle, the driver is presumed to be sufficiently large to sustain at least a partial air bag deployment without serious injury. No such presumption can be made regarding the front passenger. For example, the front passenger seat may be occupied by a rearward facing infant, a three year old child, a 6 year old child or an adult occupant of varying sizes as noted in chart 58. However, as noted above, a front passenger perceived as too small to safely withstand an airbag deployment based solely on weight, as shown in the supplemental restraint activate/deactivate decisions shown for the case based on minimum base threshold related to a certain base value may be tall enough to benefit from passive restraint deployment. The size of a front passenger may be based on data values from a weight sensor installed in the seat and the motion detection sensors. Weight sensors can include commercially available pressure mats integrated into the structure of the seat. Other forms of weight sensors include strain gauge devices and bladder-type sensors. The chart 58 of FIG. 7 illustrates conditions under which supplemental restraints, including air bags and knee bolsters would be activated when leg position and movement are sensed, and under identical conditions, but without the benefit of leg position and movement sensing, would be deactivated. As one example, an undersized adult female, lighter than a $5^{th}$ percentile female in front passenger seat 14 would not experience a supplemental restraint deployment during an impact event in a vehicle without leg position and motion sensing. However, the ability to sense leg position and motion enables the beneficial deployment of supplemental restraints for an otherwise undersized seat occupant, thereby providing enhanced occupant protection.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system comprising a controller for a vehicle, the controller comprising a processor and a memory, the memory storing instructions executable by the processor such that the controller is programmed to:
   receive data values from a sensor to detect infrared light, the sensor disposed in a line of sight to a vehicle rear passenger foot well;
   activate a rear passenger knee bolster upon determining, based at least in part on the data values, that an object is present in the foot well and in motion; and
   deactivate the knee bolster upon determining, based at least in part on the data values, that there is no motion in the foot well.

2. The system of claim 1, wherein the sensor includes both an infrared receptor and an infrared emitter.

3. The system of claim 2, wherein the sensor is installed in an interior trim panel bordering the foot well.

4. The system of claim 3, wherein the interior trim panel is installed in a vehicle door bordering the foot well.

5. The system of claim 2, wherein the sensor is installed in a back of a more forward seat that the rear seat faces.

6. The system of claim 5, wherein the controller is further programmed to, based on the data values from the sensor:
   determine a size of a gap between identified occupant legs and the back of the more forward seat;
   deactivate the knee bolster when the gap is above a predetermined size; and activate the knee bolster when the gap is below the predetermined size.

7. The system of claim 2, wherein the controller is further programmed to determine that an object is moving, and to activate the knee bolster and to deactivate the knee bolster, solely based on the data values from the sensor.

8. The system of claim 2, wherein the controller is further programmed to:
place the data values in a first memory buffer that receives and retains a predetermined number of data values;
calculate a variance of the most recent data value received by the buffer relative to the data values already in the buffer;
add the variance of the most recent data value to a second buffer;
sum the variances in the second buffer to obtain a motion detection process output; and
determine that the motion detection process output exceeds a pre-determined threshold.

9. The system of claim 1, wherein the controller is further programmed to, based on the data values from the sensor:
determine a size of a gap between identified occupant legs and a back of a more forward seat;
deactivate the knee bolster when the gap is above a predetermined size; and
activate the knee bolster when the gap is below the predetermined size.

10. The system of claim 1, wherein the knee bolster is installed in a back of a more forward seat and the more forward seat includes a pivotable mount enabling the more forward seat to rotate to a rear-facing position, and the controller being further programmed to:
receive seat data values of a rotational position of the seat from a seat position sensor; and
deactivate the knee bolster when the seat data values are outside of a predetermined deployment range.

11. A system comprising:
a controller for a vehicle, the controller comprising a processor and a memory, the memory storing instructions executable by the processor;
a sensor to detect infrared light, the sensor disposed in a line of sight to a vehicle foot well;
a selectively deployable knee bolster disposed in a back of a more forward seat that a rear seat faces;
the controller programmed to:
receive data values from the sensor;
activate the knee bolster upon determining, based at least in part on the data values, that an object is present in the foot well and in motion; and
deactivate the knee bolster upon determining, based at least in part on the data values, that there is no motion in the foot well.

12. The system of claim 11, wherein the sensor includes both an infrared receptor and an infrared emitter.

13. The system of claim 12, wherein the sensor is installed in an interior trim panel bordering the foot well.

14. The system of claim 13, wherein the sensor is installed in a back of a more forward seat that the rear seat faces.

15. The system of claim 14, wherein the controller is further programmed to, based on the data values from the sensor:
determine a size of a gap between identified occupant legs and the back of the more forward seat;
deactivate the knee bolster when the gap is above a predetermined size; and
activate the knee bolster when the gap is below the predetermined size.

16. The system of claim 11, wherein the controller is further programmed to determine that an object is moving in the foot well, and to activate the knee bolster and to deactivate the knee bolster, solely based on the data values from the sensor.

17. The system of claim 11, wherein the controller is further programmed to:
place the data values in a first memory buffer that receives and retains a predetermined number of data values;
calculate a variance of the most recent data value received by the buffer relative to the data values already in the buffer;
add the variance of the most recent data value to a second buffer;
sum the variances in the second buffer to obtain a motion detection process output; and
determine that the motion detection process output exceeds a pre-determined threshold.

18. The system of claim 11, wherein the controller is further programmed to, based on the data values from the sensor:
determine a size of a gap between identified occupant legs and the back of the more forward seat;
deactivate the knee bolster when the gap is above a predetermined size; and
activate the knee bolster when the gap is below the predetermined size.

19. The system of claim 11, further comprising a seat position sensor, and wherein the knee bolster is installed in a back of a more forward seat and the more forward seat includes a pivotable mount enabling the more forward seat to rotate to a rear-facing position, and the controller is further programmed to:
receive seat data values of a rotational position of the more forward seat from the seat position sensor; and
deactivate the knee bolster when the seat data values are outside of a predetermined deployment range.

* * * * *